United States Patent [19]
Stemme et al.

[11] Patent Number: 6,055,869
[45] Date of Patent: May 2, 2000

[54] LIFT FORCE FLUID FLOW SENSOR FOR MEASURING FLUID FLOW VELOCITIES

[76] Inventors: Erik Stemme, Prästgårdsgatan 18, S-41271 Göteborg; Göran Stemme, Ruddamsuägen 31B, S-11421 Stockholm; Edvard Kälvesten, Ivar Vidfamnes gata 3, plan 2, S-12652 Hägersten; Niklas Svedin, Villagatan 10, S-11432 Stockholm, all of Sweden

[21] Appl. No.: 08/873,414

[22] Filed: Jun. 12, 1997

[51] Int. Cl.[7] .............................. G01F 1/28; G01F 13/00
[52] U.S. Cl. .................... 73/861.71; 73/861.74; 73/719; 73/170.15; 604/533
[58] Field of Search ............ 73/861.71, 861.74, 73/204.26, 204.25, 204.21, 204.19, 719, 720, 721, 170.11, 170.12, 170.15; 604/533

[56] References Cited

U.S. PATENT DOCUMENTS

| | | | |
|---|---|---|---|
| 3,114,261 | 12/1963 | Dillon et al. | 73/861.71 |
| 3,424,000 | 1/1969 | Chelner et al. | 73/861.71 |
| 3,696,673 | 10/1972 | Ribner et al. | 73/861.74 |
| 4,843,445 | 6/1989 | Stemme | 73/204.26 |
| 5,131,265 | 7/1992 | Tobin et al. | 73/861.74 |
| 5,319,971 | 6/1994 | Osswald et al. | 73/204.26 |

FOREIGN PATENT DOCUMENTS

| | | |
|---|---|---|
| 298116 | 4/1972 | Austria . |
| 2652904 | 4/1991 | France . |

OTHER PUBLICATIONS

Patent Abstracts of Japan, JP 61071366 (Kawashima Sumihiko), Apr. 12, 1986.

*Primary Examiner*—Harshad Patel
*Attorney, Agent, or Firm*—Andrus, Sceales, Starke & Sawall

[57] ABSTRACT

A fluid flow sensor uses lift forces exerted on a plate-like airfoil member to determine the velocity of a fluid flowing past the sensor. The member has a pair of spaced, low aspect ratio airfoil elements. A central portion of the airfoil member is coupled to a frame that positions the airfoil member in the fluid flow with an angle of attack with respect to the fluid flow direction. The flowing fluid generates velocity related lift forces on the airfoil member, the magnitude of which decrease along the airfoil member from the upstream end to the downstream end. The lift forces so applied deflect the upstream airfoil element to a greater extent than the downstream airfoil element. Strain gauges are coupled to the airfoil elements to detect their deflection. The strain gauges are connected in a bridge configuration to provide a signal indicative of fluid velocity.

54 Claims, 6 Drawing Sheets

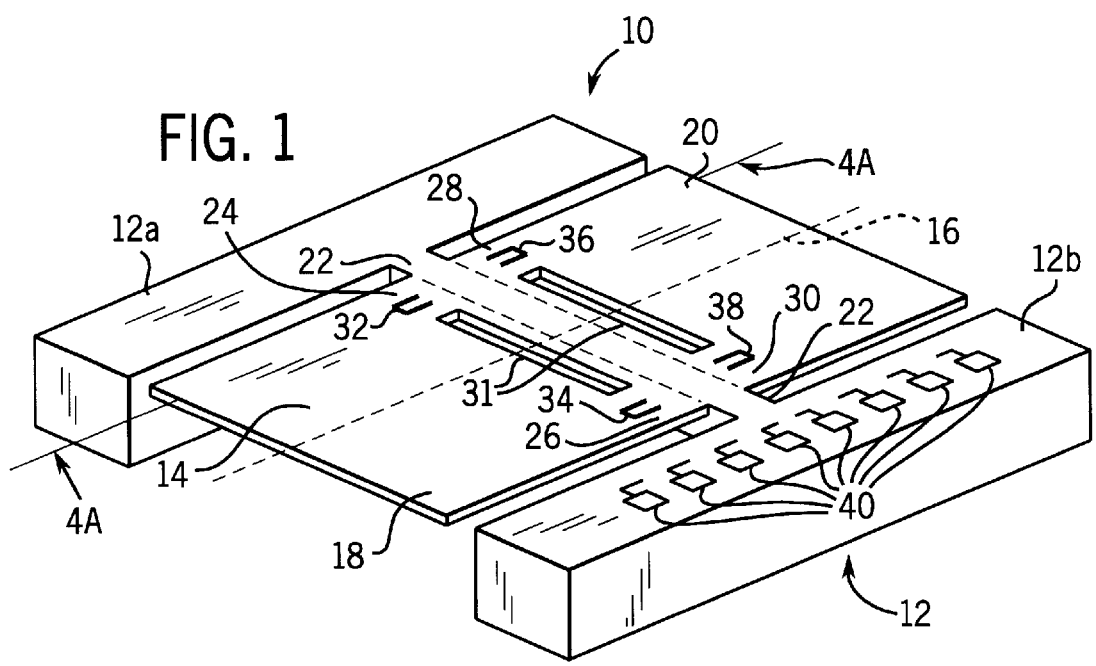
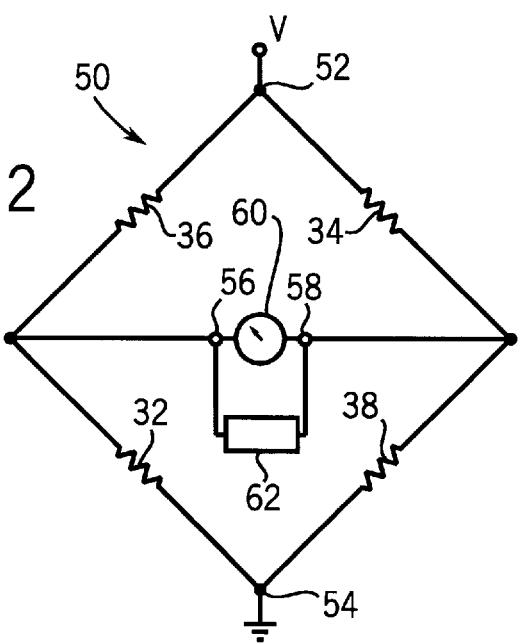

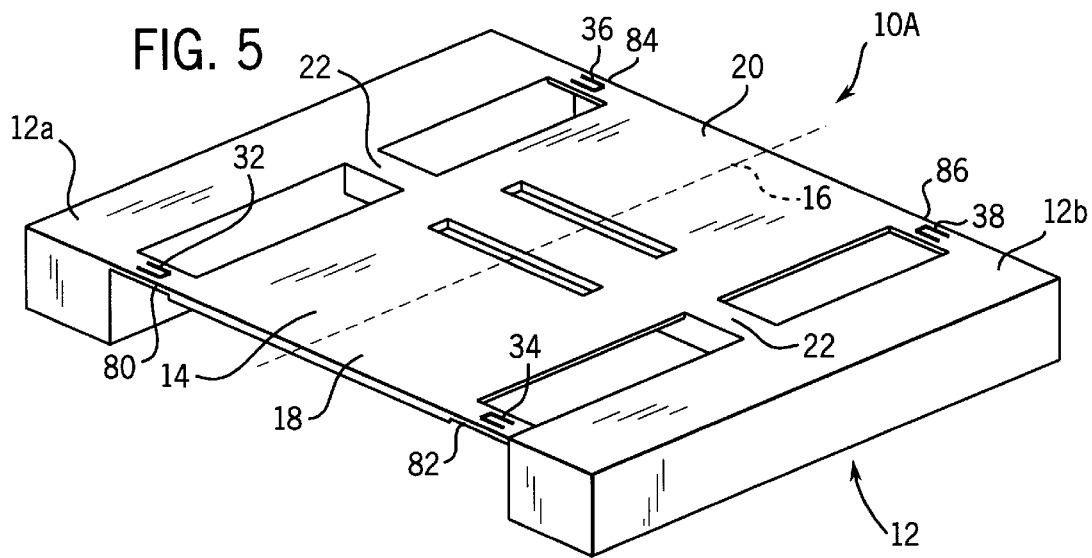
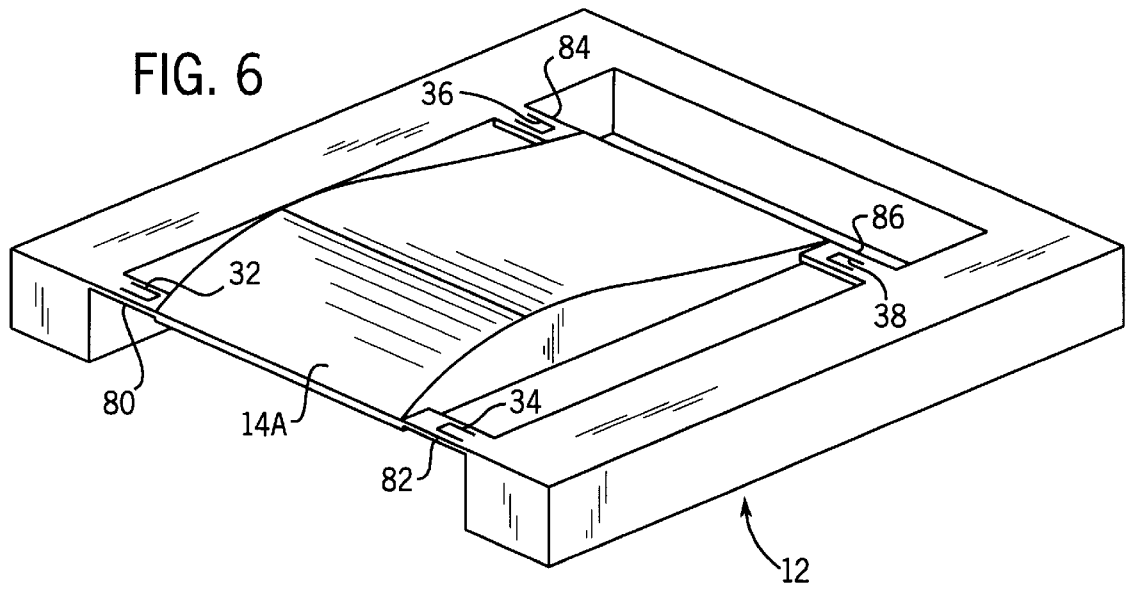

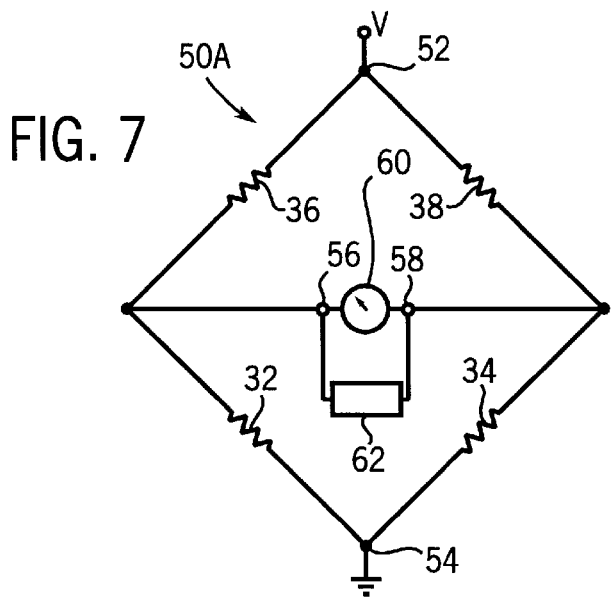
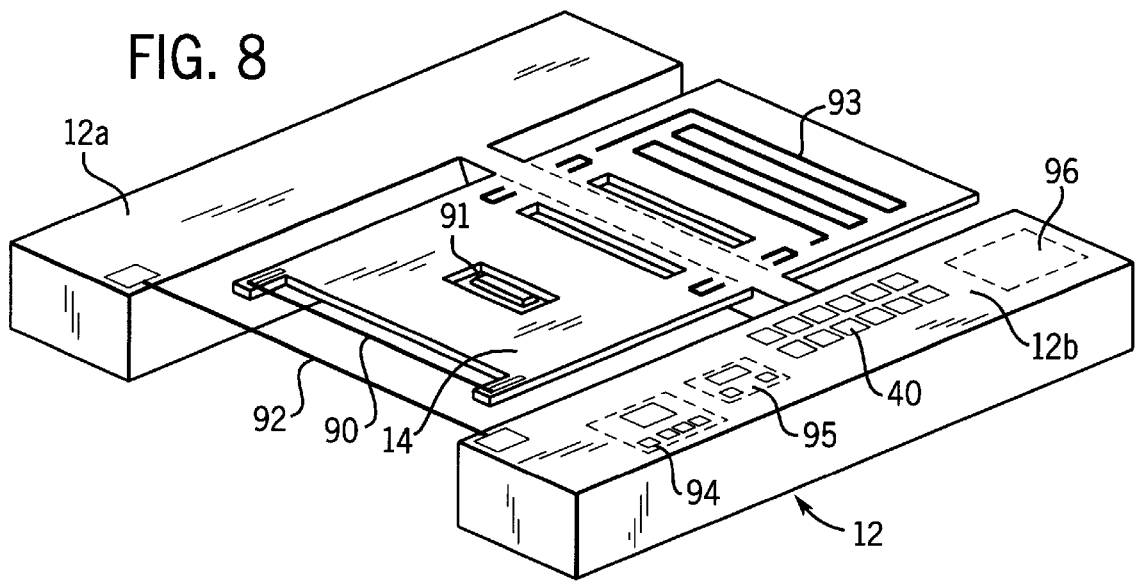

LIFT FORCE FLUID FLOW SENSOR FOR MEASURING FLUID FLOW VELOCITIES

The present invention relates to a fluid flow sensor employing lift forces exerted on an airfoil member to determine the velocity of a fluid flowing past the sensor.

BACKGROUND OF THE INVENTION

Fluid sensors are known which utilize the drag forces exerted on a body by the flowing fluid to determine the velocity of the latter. Drag forces arise in a direction parallel to the flow of fluid and result from the resistance presented by the body to the fluid flow. However, body forms that give rise to drag forces of a magnitude that can be used to provide an appropriate output from the sensor often also give rise to turbulence in the fluid flow. This causes non-linearities or other discontinuities and anomalies to appear in the output of the sensor, adversely affecting its accuracy unless compensation is provided for same, and rendering the instrument hard to use. Such a sensor may also cause a significant pressure drop in the flowing fluid. Such a pressure drop may adversely affect the operation of apparatus associated with the fluid sensor or the application to which the fluid sensor may be put. For example, when such a sensor is used to measure the breathing gas flows of a patient, it may increase the exertions required of the patient in breathing.

BRIEF SUMMARY OF THE INVENTION

It is the object of the present invention to provide an improved fluid flow sensor for measuring the flow velocity of a liquid or a gas. In contrast to the sensors described above, the fluid flow sensor of the present invention employs lift forces, rather than drag forces, to carry out the sensing function. Lift forces arise in a direction perpendicular to the fluid flow direction and result from differential fluid flows over the body and from deflection of the flowing fluid by the body.

The fluid flow sensor of the present invention possesses sensitivity and dynamic response characteristics capable of accurately measuring fluid flow velocities over a wide range of velocities and variations thereof. At the same time, it is relatively insensitive to disturbances such as acceleration forces and variations in temperature, humidity, and other ambient phenomena. The fluid flow sensor may be made small in size. Due to its small size and small effective cross sectional area presented to the fluid flow, the sensor induces only a relatively low pressure drop in the flowing fluid. The fluid flow sensor of the present invention is capable of sensing the velocity of fluid flowing in either direction past the sensor without alteration of the sensor. The fluid flow sensor may be combined with other apparatus, as for example other fluid flow measuring apparatus thereby to extend the dynamic range over which fluid flow phenomena may be sensed.

The fluid flow sensor of the present invention is suitable for use in a wide variety of applications. Included in such applications is its use in connection with the measurement of breathing gas flows of a patient in which applications the low pressure drop, accuracy, dynamic response, and stability of the gas flow sensor are highly advantageous, as is its bi-directional measuring capabilities.

In particular, the fluid flow sensor may be used in the medical technology field such as with respirators or ventilators for measuring the breathing gas flows of a patient. A respirator ventilating a patient typically has three magnetic valves, two for regulating the flow of air and oxygen into the patient and one for regulating the flow of air out of the patient. To measure the flow velocity of air and oxygen, gas flow sensors are placed along the inspiratory and expiratory branches of the respirator ventilating system.

There are four possible locations for gas flow sensors inside the respirator and one location at a Y-piece junction between the respirator and the patient. The gas flow sensors inside the respirator are used as part of a feedback loop in controlling gas flows to produce the required inspiratory flow, expiratory flow and tidal volume patterns. A pair of gas flow sensors are placed in the oxygen and air inspiratory branches of the respirator which lead to the Y-piece junction between the respirator and the patient. Another gas flow sensor is placed in the inspiratory branch of the respirator downstream from the oxygen and air inspiratory branches. The oxygen and air inspiratory branches are joined together forming a single inspiratory branch within the respirator. A fourth gas flow sensor is placed in the expiratory branch of the respirator. A gas flow sensor may also be placed in the Y-piece junction between the respirator and the patient. The respirator gas flow sensors operate in a uni-directional manner whereas the Y-piece gas flow sensor operates in a bi-directional manner. The Y-piece junction is often a dirty environment and is therefore not suitable for using the wing type gas flow sensor of the present invention.

There are also other applications of the gas flow sensor where the airway flow of spontaneously breathing patients is measured during standard lung function spirometric tests. The gas flow sensor of the present invention is well suited for this application especially if protected by filters.

The fluid flow sensor of the present invention includes a sensing device subjected to the flow of fluid, the velocity of which is to be measured. Detector elements of the sensing device are coupled in a configuration, such as an electrical bridge circuit, that forms a measuring and indicating device for the fluid flow sensor providing a signal indication of the velocity of the fluid.

The sensing device has a frame by which the device may be positioned in the fluid flow. In one embodiment of the invention, a plate-like airfoil member supported by the frame has a pair of spaced airfoil elements, typically of low aspect ratio, one of which is formed at each end of the airfoil member. The airfoil elements are joined to a center portion of the airfoil member which is coupled to the frame.

The airfoil member is positioned with an angle of attack with respect to the direction of gas flow. The flowing gas generates velocity related lift forces perpendicular to the gas flow direction which are applied to the airfoil member which create bending moments at the joinder of the airfoil elements to the center portion. The magnitude of the lift forces decreases along the airfoil member from the upstream end to the downstream end of the airfoil member to create greater bending moments in the upstream airfoil element than in the downstream airfoil element.

Suitable detectors, such as variable resistance strain gauges, are coupled to the airfoil elements to detect the strain in the airfoil member resulting from the bending moments generated by the gas flow lift forces. The strain gauges are connected in an electrical bridge configuration. The greater bending moments in the upstream airfoil element causes a greater resistance change in the strain gauges associated with that element than occurs in the strain gauges associated with the downstream airfoil element. The relative change in the resistance of the strain gauges enables the bridge configuration to provide a signal indicative of gas flow velocity.

BRIEF DESCRIPTION OF THE SEVERAL VIEWS OF THE DRAWING

The invention will be further understood by reference to the following detailed description, taken in conjunction with the drawing, in which:

FIG. 1 is a perspective view of one embodiment of the fluid flow sensing device incorporated in the fluid flow sensor of the present invention;

FIG. 2 shows one manner of electrically connecting certain elements of the fluid flow sensing device to provide an indication of fluid flow velocity;

FIG. 5 shows a modification of the fluid flow sensing device;

FIG. 6 shows modification of the airfoil member and frame of the fluid flow sensing device;

FIG. 7 shows a modified electrical connection of element of the fluid flow sensor of the present invention;

FIG. 8 shows the fluid flow sensing device employed in conjunction with other sensors and apparatus.

DETAILED DESCRIPTION OF THE INVENTION

Figure 3:
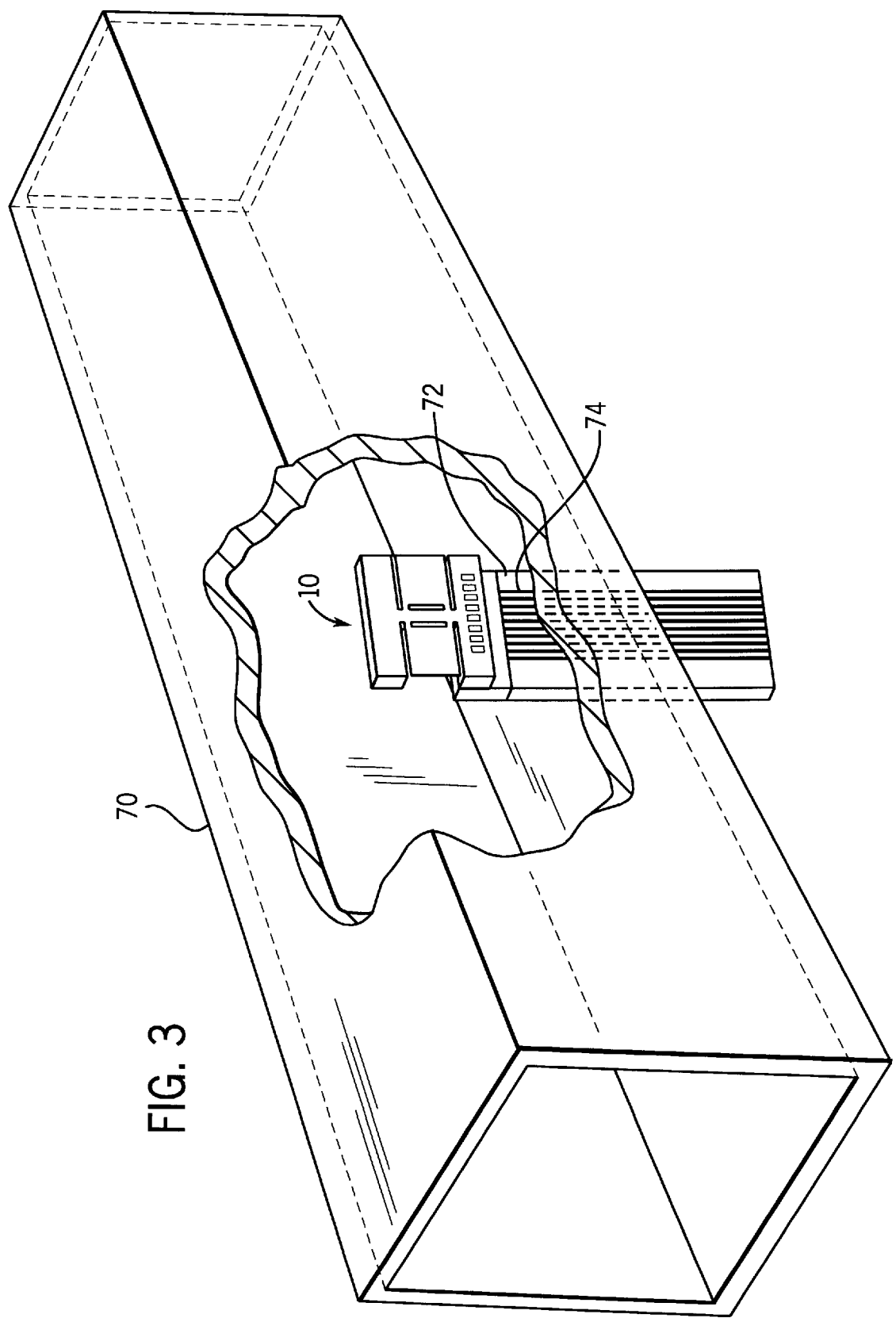
FIG. 3 is a view showing the sensor positioned in a gas flow conduit for measuring gas flow velocities in the conduit.

As shown in FIG. 1, the fluid flow sensor of the present invention includes a fluid flow sensing device 10 for measuring the flow velocity of a liquid or a gas. Fluid flow sensing device 10 has frame 12 for positioning the fluid flow sensing device in a gas flow conduit in the manner described below in connection with FIG. 3. Frame 12 may include spaced side supports 12a and 12b.

Frame 12 supports airfoil member 14. In a preferred embodiment of fluid sensing device 10, frame 12 and airfoil member 14 may be formed as an integral structure fabricated from a wafer of crystalline silicon.

Airfoil member 14 is formed as a thin, flat, plate having a chord dimension 16, shown as a dotted line. A pair of spaced airfoil elements 18 and 20 are formed along chord dimension 16 in the end portions of airfoil member 14. The central portion of airfoil member 14, intermediate airfoil elements 18 and 20, is formed as a center support beam 22 joined to side supports 12a and 12b.

Airfoil elements 18 and 20 preferably have a low aspect ratio, the aspect ratio being defined, most straightforwardly, as the ratio of the dimension of the element perpendicular to the fluid flow, i.e. the "span", divided by the chord dimension. To this end, each airfoil element 18 and 20 may be square, giving each element an aspect ratio of 1. The airfoil elements may be 5×5 mm, or smaller, and 15 $\mu$m thick, or less.

In the embodiment of the invention shown in FIG. 1, the airfoil elements 18 and 20 are each coupled to center support beam 22 through two spaced, flexible, stress-concentrating links which allow airfoil elements 18 and 20 to induce strains in the links. Links 24 and 26 couple airfoil element 18 to center support beam 22. Links 28 and 30 couple airfoil element 20 to center support beam 22. Slits 31 in airfoil member 14 are formed between links 24 and 26 and 28 and 30. While FIG. 1 shows a link along each side of the airfoil elements, it will be appreciated additional center links may be provided if deemed necessary to support airfoil elements on center support beam 22 or for other reasons. A plurality of slits would then be formed between each airfoil element and the center support beam.

A strain gauge or other suitable means is located on each of links 24–30 to detect lift force induced strain produced by airfoil elements 18 and 20. Strain gauges 32 and 34 are located on links 24 and 26 coupling airfoil element 18 to center support beam 22. Strain gauges 36 and 38 are located on links 28 and 30 coupling airfoil element 20 to center support beam 22. The strain gauges may be formed as polysilicon piezoresistive strain sensitive resistors.

Strain gauges 32–38 are connected by conductors, not shown, to connection terminals 40 mounted on one of side supports 12a, 12b to provide external connections for the strain gauges.

As shown in FIG. 2, strain gauges 32–38 may be connected in a bridge configuration 50 of the Wheatstone type. Bridge 50 comprises input or electrical supply terminals 52 and 54, electrical output terminals 56 and 58, and four arms, each of which extends between one of the electrical supply terminals and one of the electrical output terminals. One of strain gauges 32–38 is located in each of the arms of bridge 50. In the configuration shown in FIG. 2, strain gauges 32 and 34 associated with airfoil element 18 are connected in opposite arms of the bridge and strain gauges 36 and 38 associated with airfoil element 20 are connected in the remaining opposite arms of bridge 50. Such a configuration provides a differential mode operation to bridge 50. An output device, such as meter 60 and/or signal processing circuit 62, is connected across output terminals 56 and 58.

As shown in FIG. 3, fluid flow sensing device 10 is interposed in gas flow conduit 70. For this purpose, fluid flow sensing device 10 may be mounted on positioning member 72 containing the electrical connectors 74 necessary to connect strain gauge elements 32–38 in the bridge configuration shown in FIG. 2.

Also as shown in FIG. 3, fluid flow sensing device 10 is positioned in gas flow conduit 70 to lie at an angle to the axis of gas flow conduit 70 and hence to the direction of gas flow through the conduit.

As an alternate embodiment, fluid flow sensor 10 may be positioned in a vertical orientation on positioning member 72 by rotating the fluid flow sensor 10 90 degrees from its position shown in FIG. 3. In this position, the chord dimension of fluid flow sensor 10 is perpendicular to the direction of gas flow through conduit 70. The vertical orientation of fluid flow sensor 10 provides an alternate means for measuring fluid flow velocity.

THEORY AND PRINCIPLE OF OPERATION OF FLUID FLOW SENSOR

Figure 4A:
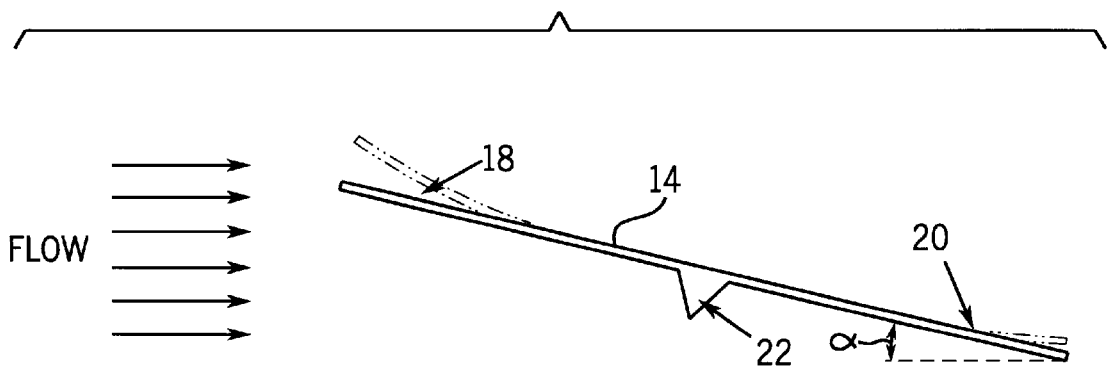
FIG. 4A is a partial cross sectional view along the line 4A—4A of FIG. 1 showing an airfoil member of the sensor of the present invention in a gas flow.

FIG. 4A shows airfoil member 14 and airfoil elements 18 and 20 lying at an angle to the gas flowing in conduit 70. With the gas flowing in the direction shown in FIG. 4A, airfoil element 18 is the upstream, or front, airfoil element and airfoil element 20 is the downstream, or rear, airfoil element. The angle at which airfoil member 14 lies with respect to the gas flow forms the flow angle or aerodynamic angle of attack of the elements to the flow, conventionally designated as $\alpha$.

The general expression for the lift force to which airfoil elements 18 and 20 are subjected is as follows:

$$F_{lift} = C_L \cdot \frac{\rho V_\infty^2}{2} \cdot b \cdot c \quad (1)$$

V∞: free-stream velocity
ρ: density of the fluid
$C_L$: lift force coefficient (dependent on airfoil geometry and angle of attack α)
b,c: width and length, i.e. span and chord of the airfoil structure, respectively.

The distribution of the lift force along airfoil elements 18 and 20 may be obtained from the theory of thin airfoils in which a thin plate in a uniform stream can be simulated as a vortex sheet with a vortex strength which depends on the flow angle. The fundamental equation for thin airfoil theory for a flat plate is:

$$\frac{1}{2\pi} \int_0^c \frac{\gamma(\xi) d\xi}{\chi - \xi} = V_\infty \cdot \alpha \quad (2)$$

$\gamma_\xi$: vortex strength along the airfoil
ξ: integration variable along the chord line
α: angle of attack of flow The integral is taken from the leading edge (X=0) of airfoil member 14 to the trailing edge (X=c) of the member. The sheet strength that solves Eq. (2) gives the vortex strength along the airfoil as:

$$\gamma(\chi) = 2 \cdot V_\infty \cdot \alpha \cdot \sqrt{\frac{c}{\chi} - 1} \quad (3)$$

The lift force can be obtained from Eq. (3) through the relation $dF_{lift} = \rho_\infty V_\infty \gamma(\xi)$. Under the assumption that the flow disturbance induced by center support beam 22 is neglected, a normalized force distribution is given as:

$$q(\chi) = \frac{1}{F_{lift}} \frac{dF_{lift}}{d\chi} = \frac{2}{c\pi} \sqrt{\frac{c}{\chi} - 1} \quad (4)$$

The normalized lift force distribution determined by Eq. (4) is shown in graphic form in FIG. 4B.

Figure 4B:
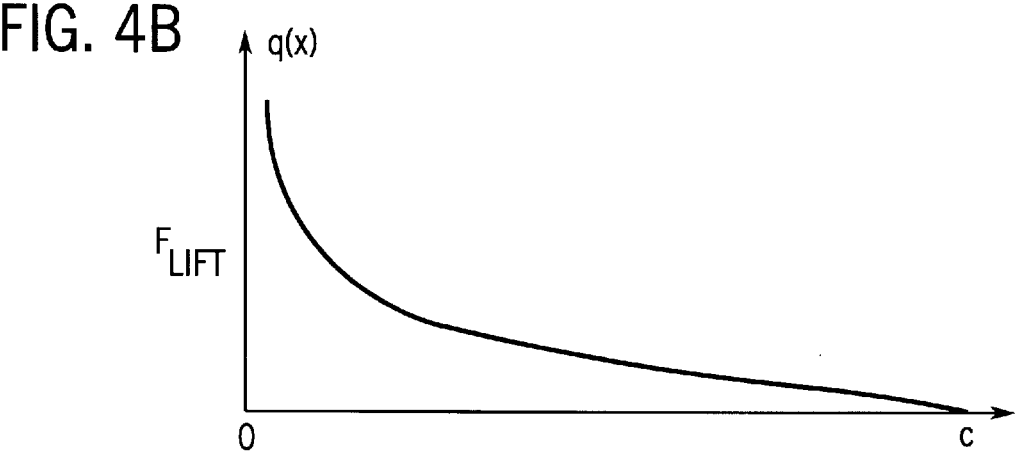
FIG. 4B shows the lift forces to which the airfoil member, positioned as in FIG. 4A, is subjected.

As clearly noted in FIG. 4B, there is a non-uniform distribution of the fluid flow generated lift forces along the chord dimension of airfoil member 14 so that the lift forces vary in magnitude along the chord dimension of airfoil member 14. Front airfoil element 18 is subjected to a greater lift force than is rear airfoil element 20.

Since airfoil elements 18 and 20 are joined at their inner ends to center support beam 22, the lift forces applied to airfoil member 14 give rise to bending moments in the airfoil member. The greater lift forces to which front airfoil element 18 is subjected creates a greater bending moment and urges deflection of that element to a greater extent than do the lesser lift forces applied to rear airfoil element 20. Typical deflections that may occur in airfoil member 14 are shown in dotted lines in FIG. 4A.

The greater bending moment which front airfoil element 18 is subjected causes a greater change in the resistance of strain gauges 32 and 34 associated with this element than occurs in strain gauges 36 and 38 associated with rear airfoil element 20. This relative change in the resistances of strain gauges 32–38 connected in bridge configuration 50 unbalances the bridge and provides an output signal at output terminals 56–58 of the bridge which is indicative of the fluid flow velocity producing the forces applied to front airfoil element 18 and rear airfoil element 20.

The bending moments arising in front and rear airfoil elements 18 and 20 may be obtained by integrating the lift force shown in FIG. 4B along the front and rear airfoil elements:

$$M_{front} = -\frac{c}{2}\left[\frac{1}{\pi} + \frac{1}{4}\right] \text{ and } M_{rear} = \frac{c}{2}\left[\frac{1}{\pi} - \frac{1}{4}\right] \Rightarrow \frac{M_{front}}{M_{rear}} = \frac{4+\pi}{4-\pi} \approx 8.3 \quad (5)$$

As will be seen from an inspection of Eq. (5), the bending moments in front airfoil element 18, and hence the relative change in the resistance in strain gauges 32 and 34 on links 24 and 26, is 8.3 times higher than the bending moment on rear airfoil element 20 and, hence the relative change in resistance of strain gauges 36 and 38 on links 28 and 30. Because the bending moment in the rear airfoil element 20 is of such a low relative magnitude, the rear airfoil element 20 may be considered a relatively passive element as compared to front airfoil element 18.

The differential, relative change in strain gauge resistance enables the fluid flow sensor of the present invention to provide a highly sensitive and accurate indication from bridge configuration 50 of the velocity of the fluid flow passing the sensor. The strains produced by the bending moment applied to the front and rear airfoil elements are concentrated in links 24–30 by the presence of slits 31, thereby also improving the flow sensitivity of fluid sensing device 10.

Connecting strain gauges 32–38 in bridge configuration 50 in the differential mode manner shown in FIG. 2 reduces the sensitivity of fluid flow sensor 10 to acceleration and to changes in other ambient conditions, such as temperature and humidity, which affect airfoil elements 18 and 20 in an equal manner.

It will be noted by an examination of Eq. (3) that the lift force to which airfoil elements 18 and 20 are subjected increases with an increasing angle of attack α. For low aspect ratio airfoils such as those comprising elements 18 and 20, experiments have indicated that the angle of attack could approach 45° although it is deemed preferable to position airfoil elements 18 and 20 of the type shown in FIG. 1 at an angle of attack of approximately 10°–20°.

If the direction of gas flow in conduit 70 and past the fluid flow sensor is reversed, the designation of front and rear in describing airfoil elements 18 and 20 also becomes reversed. Further, the application of the lift forces and the generation of bending moments in the airfoil elements would occur in the opposite direction from that shown in FIG. 4. In essence, the operation of airfoil elements 18 and 20 would be upside down from the operation shown in FIG. 4A. The manner in which the velocity of the fluid flow past fluid flow sensing device 10 is determined remains unaltered from that described above. Due to its symmetrical design, fluid flow sensing device 10 is thus capable of measuring the velocity of gas or liquid flowing in either direction through conduit 70 without alteration of the device.

MODIFICATIONS

A modification of fluid flow sensing device 10 is shown in FIG. 5. In the embodiment of the invention of FIG. 5, strain gauges 32–38 of fluid flow sensing device 10A are provided at the outer ends of airfoil elements 18 and 20 opposite to the ends connected to center support beam 22. The strain gauges are located in links 80–86 between the outer ends of airfoil elements 18 and 20 and side supports 12a and 12b. Links 80–86 connecting the outer ends of airfoil elements 18 and 20 to side supports 12a and 12b may be the same thickness as airfoil elements 18 and 20. Or, the links may be thinner than the airfoil elements, as shown in FIG. 5.

The modification of the fluid flow sensing device shown in FIG. 5, may be further modified, if desired, to eliminate the center support beam 22, allowing airfoil member 14 to be supported solely by links, such as links 80–86 connected between the outer ends of airfoil elements 18 and 20 and side supports 12a and 12b. In such an embodiment, frame 12 can be of a U-shaped form for positioning side supports 12a and 12b to embrace airfoil member 14.

Still further, while a plate-like airfoil member 14 is shown in FIGS. 1 and 5, an airfoil member having curved surfaces in the profile of the airfoil may be employed. Such an airfoil member is shown as airfoil member 14A in FIG. 6. FIG. 6 also shows an embodiment of the invention omitting center support beam 22 and having a U-shaped frame 12.

FIG. 7 shows bridge 50A in which strain gauges 32–38 are connected in a common mode configuration, rather than the differential mode configuration shown in FIG. 2. Such a configuration increases the range of angles of attack at which the sensor may be operated by allowing the angle of attack provided to airfoil member 14 to be increased. For angles above about 25°, the airfoil member stalls and drag forces increasingly predominate. As drag forces act equally on both airfoil elements, the configuration shown in FIG. 2 gives no net output for such forces whereas as a signal is provided in the common mode connection shown in FIG. 7. However, the bridge configuration 50A shown in FIG. 7 does not have the same ability to suppress signal variations induced by acceleration forces that bridge configuration 50 shown in FIG. 2 possesses.

While the embodiments of the invention shown in FIGS. 1 and 5 of the present invention employ front and rear airfoil elements 18 and 20 symmetrically joined to center support beam 22, it is possible to form the fluid flow sensing device with a single airfoil element joined at one end to a support beam. While such a sensing device is simplified with respect to that shown in FIGS. 1 and 5, it would not be possible to provide the immunity to acceleration forces enjoyed by the symmetrical airfoil element embodiment shown in FIGS. 1 and 5. The connection of the strain gauges to such an airfoil element could be either in the manner shown in FIG. 1 or the manner shown in FIG. 5.

Fluid flow sensing device 10, 10A may be employed in conjunction with other sensors or apparatus, as shown in FIG. 8. Thus, fluid flow sensing device 10 may be employed with other types of flow sensors, such as hot wire or hot film thermal flow sensors which may be incorporated in airfoil member 14 and/or frame 12. See, for example, thermal flow sensors 90 and 91 incorporated in airfoil member 14 and thermal flow sensor 92 incorporated in frame 12.

Hot wire or hot film thermoflow sensors are very good for measuring low flow velocities, but are not very good for measuring high flow velocities. On the other hand, an airfoil sensor is not very good for measuring low flow velocities, but is very good for measuring high flow velocities. Therefore, in a respirator environment for measuring breathable gas velocities, it would be advantageous to use a hot wire or hot film thermoflow sensor for measuring flows less than 10–20 liters per minute and using an airfoil sensor for measuring flows greater than 10–20 liters per minute. This combination type sensor utilizing a hot wire or hot film thermoflow sensor and an airfoil sensor would make an excellent flow sensor with a wide dynamic range.

If desired, airfoil member 14 may incorporate a heater 93, for heating the flow sensing device. The heater 93 facilitates constant temperature control which makes the sensor insensitive to fluid temperature changes. The heater 93 also reduces moisture deposition on the sensor element, which otherwise might reduce sensor performance.

Frame 12 may incorporate sensors measuring other phenomena, such as pressure or temperature. See sensors 94 and 95 shown in FIG. 8 as mounted on side support 12b. The frame may also include circuitry, typically integrated circuitry 96 for controlling and signal processing the various sensors and/or the signals produced by the strain gauges.

The other types of flow sensors, such as the thermal flow sensors 90–92 shown in FIG. 8, may be utilized to enhance or optimize the flow measurement accuracy at both high and low flow rates.

FABRICATION

Figure 9A:
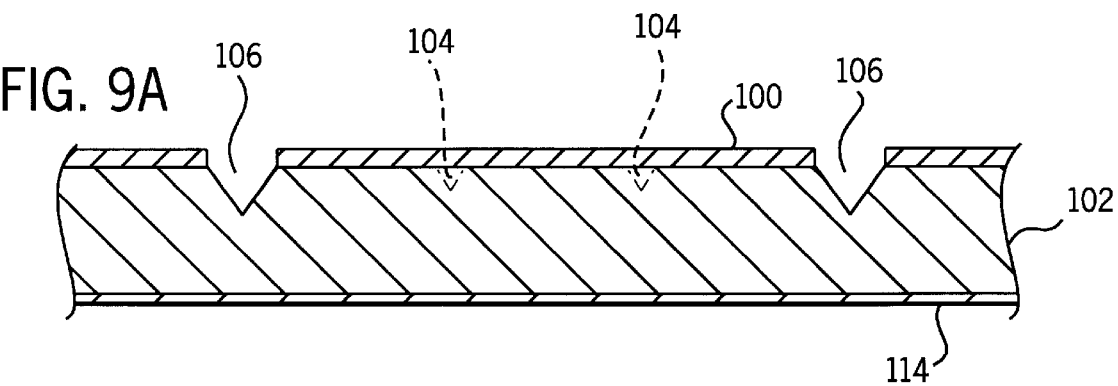
FIGS. 9A through D show a technique for fabricating the sensing device employed in the fluid sensor of the present invention.
Figure 9B:
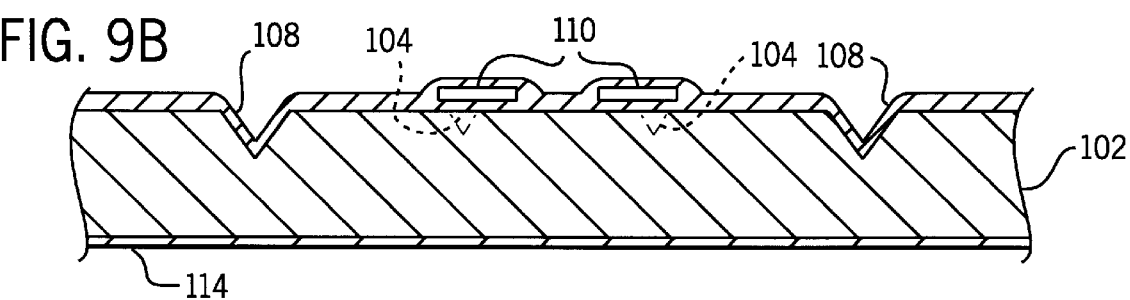

FIG. 9A shows initial steps in the fabrication of the fluid sensing device 10. First, a silicon dioxide mask 100 is thermally grown onto one side of a rectangular piece of silicon substrate 102. Mask 100 leaves portions of substrate exposed to define the airfoil member 14, slits 31, and links 24–30. A corrosive solution, preferably potassium hydroxide, is then applied to the masked surface of a substrate 102 to form 30 μm deep V-shaped grooves 104, and 60 μm deep V-shaped grooves 106. Strain gauges will align with grooves 104 which will become slits 31. Grooves 106 define the edges of the airfoil elements and links. After the etching process is complete, a silicon dioxide mask 108 is grown over the newly etched substrate, as shown in FIG. 9B. The purpose of this new mask is three-fold: 1) to insulate the strain gauges from the substrate; 2) to fill the grooves and serve as an etch stop during the final etch; and 3) to act as a masking material on the opposite side of substrate 102.

FIG. 9B also shows how the strain gauge assemblies are placed in relation to grooves 104 which will become slits 31. Polysilicon resistors 110 form the basis of the strain gauges. Resistors 110 are initially formed upon the substrate by depositing a 5,000 Å layer of polysilicon. The polysilicon layer is doped using ion implantation, at 1e16 cm$^{-2}$ using 80 keV. Photolithography and a polysilicon dry etch is used to form the final strain gauge configuration. Lastly, a low temperature oxide layer is deposited over the resistors and the resistors annealed to activate the dopants.

Lithographic means are used to create contact holes in the low temperature oxide layer over each resistor 110, and in the same step the silicon dioxide mask from the surface of airfoil elements 18 and 20 is removed. After opening the contact holes to resistors 110, a 0.5 μm layer of aluminum sputter 112 is deposited over the contact holes to form the conductors for the resistors and connection terminals 40. See FIG. 9C.

Figure 9C:
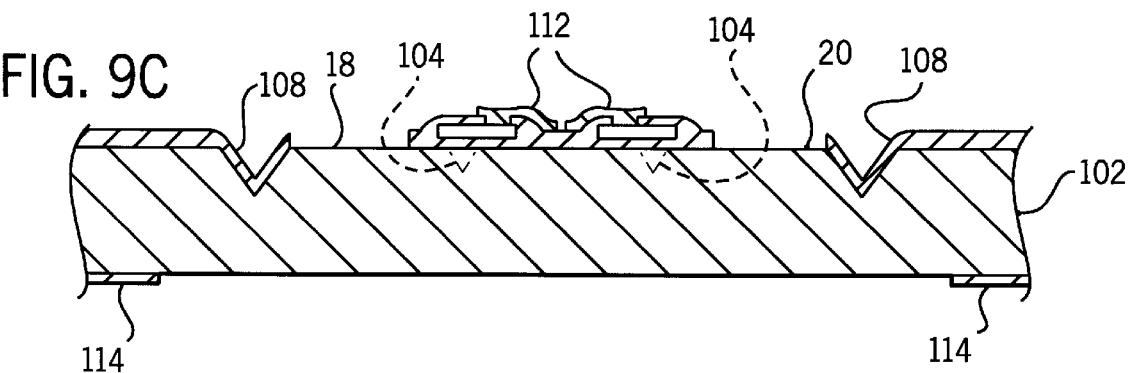
Figure 9D:
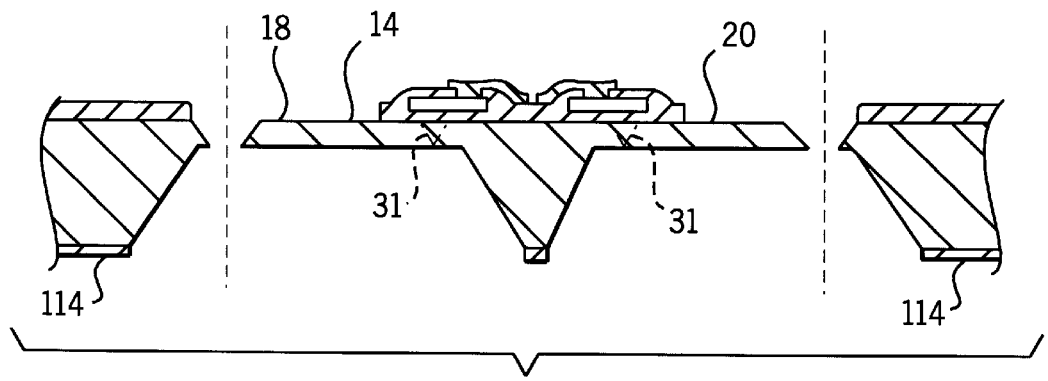

The upper surface containing the strain gauge formed of layers 100, 104, 110, 112 is protected mechanically using black wax to attach a dummy-wafer to the surface assemblies during the final steps in the fabrication. To complete the fabrication of the fluid flow sensing device 10, material is removed from the substrate surface opposite that which contains the strain gauges, i.e. the bottom surface shown in FIG. 9C. First, a pattern is dry etched into the silicon dioxide layer 114 to form an etch mask, as shown in FIG. 9C. Second, the opposite surface of substrate 102 is etched with potassium hydroxide until the apexes of grooves 104 become visible, thereby to form slits 31. See FIG. 9D. At this stage, the newly formed airfoil elements are connected to frame 12 by the thin oxide layer 108 remaining in what is left of V-grooves 106. The remaining oxide is then removed by briefly immersing the entire device 10 in a hydrogen fluoride bath, leaving airfoil elements 18 and 20 free, as shown in FIG. 9D. A sawing process is used to cut the finished fluid flow sensing device 10 from the silicon substrate.

It is recognized that other equivalents, alternatives, and modifications in addition to those expressly stated, are possible and within the scope of the appended claims.

We claim:

1. A fluid flow sensing device for sensing the velocity of a fluid flowing past the sensing device along a flow direction, said sensing device comprising:
 a frame;
 an airfoil member formed as a Plate member having a flat surface exposed in its entirety to the fluid flow, said airfoil member having a chord dimension extending generally along the fluid flow and a span dimension extending generally transverse to the fluid flow, said chord dimension and span dimension defining a plane in the airfoil member, said airfoil member having a shape, and orientation with respect to the fluid flow direction, such that the flow of fluid past said flat surface generates lift forces on said airfoil member perpendicular to the fluid flow direction, the magnitude of the forces being related to the velocity of the fluid flow; and
 at least one link coupling said airfoil member to said frame, said link lying generally parallel to the plane defined in said airfoil member, said link being subjected to force as a result of the lift forces generated on said airfoil member, said link undergoing strain, as a result of the forces to which it is subjected, which strain comprises an indication of the velocity of the fluid.

2. The fluid flow sensing device according to claim 1 further including a detector for detecting the strain that said at least one link undergoes for providing an indication of the velocity of the fluid flow.

3. The fluid flow sensing device according to claim 2 wherein the exertion of the lift forces on said airfoil member gives rise to bending in said at least one link and wherein said detector measures the response of said at least one link to said bending.

4. The fluid flow sensing device according to claim 2 wherein said airfoil member has end portions lying along the chord dimension of said airfoil member, said airfoil member having a first airfoil element in one of said end portions and a second airfoil element in the other of said end portions and wherein the adjacent ends of said first and second airfoil elements are connected to links having detectors operatively associated therewith.

5. The fluid flow sensing device according to claim 4 wherein said detectors comprise variable resistance elements connected in a bridge configuration.

6. The fluid flow sensing device according to claim 2 wherein said airfoil member has ends defining the ends of the chord dimension, and wherein said ends of said airfoil member are connected to links having detectors operatively associated therewith.

7. The fluid flow sensing device according to claim 6 wherein said airfoil member has a thickness normal to said plane and wherein said links have a thickness less than the thickness of said airfoil member.

8. The fluid flow sensing device according to claim 6 wherein said detectors comprise variable resistance elements connected on a bridge configuration.

9. The fluid flow sensing device according to claim 2 wherein said detector comprises at least one variable resistance element.

10. The fluid flow sensing device according to claim 9 wherein said detector comprises at least one strain gauge.

11. The fluid flow sensing device according to claim 9 wherein said detector comprises at least one piezoresistive strain sensitive resistor.

12. The fluid flow sensing device according to claim 9 wherein said variable resistance element is connected in a bridge configuration to provide a signal indication of fluid flow velocity.

13. The fluid flow sensing device according to claim 12 wherein said variable resistance element is connected in a differential mode bridge configuration.

14. The fluid flow sensing device according to claim 12 wherein said variable resistance element is connected in a common mode bridge configuration.

15. The fluid flow sensing device according to claim 2 further including electronic signal processing circuitry for said detector mounted on said frame.

16. The fluid flow sensing device according to claim 1 wherein said airfoil member is further defined as having a shape and orientation such that the flow of fluid past said flat surface generates lift forces that vary in magnitude along the chord dimension of said airfoil member.

17. The fluid flow sensing device according to claim 16 further including a detector for detecting the strain that said at least one link undergoes for providing an indication of the velocity of the fluid flow.

18. The fluid flow sensing device according to claim 17 wherein the exertion of the lift forces on said airfoil member gives rise to bending in said at least one link and wherein said detector measures the response of said at least one link to said bending.

19. The fluid flow sensing device according to claim 17 wherein said airfoil member is oriented so that the chord dimension of the plate member defines an angle of attack greater than zero with respect to the fluid flow direction.

20. The fluid flow sensing device according to claim 19 wherein said airfoil member has end portions lying along the chord dimension of said airfoil member, said airfoil member having a first airfoil element in one of said end portions and a second airfoil element in the other of said end portions, said first and second airfoil elements being subjected to lift forces of different magnitudes.

21. The fluid flow sensing device according to claim 1 wherein said airfoil member is oriented so that the chord dimension of the plate member defines an angle of attack greater than zero with respect to the fluid flow direction.

22. The fluid flow sensing device according to claim 21 wherein said airfoil member has end portions lying along the chord dimension of said airfoil member, said airfoil member having a first airfoil element in one of said end portions and a second airfoil element in the other of said end portions.

23. The fluid flow sensing device according to claim 22 wherein said airfoil member has a central portion intermediate said first and second airfoil elements, said center portion being coupled to said frame, each of said first and second airfoil elements having at least one link coupling said airfoil elements to said central portion.

24. The fluid flow sensing device according to claim 23 wherein said airfoil elements each have at least one slit extending transverse to the direction of fluid flow adjacent said central portion of said airfoil member.

25. The fluid flow sensing device according to claim 22 wherein said airfoil elements each have a span dimension extending generally transverse to the fluid flow direction and a chord dimension occupying a portion of the chord dimension of said airfoil member and wherein said airfoil elements are dimensioned to have a low aspect ratio.

26. The fluid flow sensing device according to claim 25 wherein said airfoil elements are square.

27. The fluid flow sensing device according to claims 25 wherein said airfoil elements are thin, flat members containing said plane and having a dimension normal to said span and chord dimensions substantially less than the span and chord dimensions.

28. The fluid flow sensing device according to claim 21 wherein said plate member is further defined as oriented at an angle of attack of 45° or less.

29. The fluid flow sensing device according to claim 28 wherein said plate members is further defined as oriented at an angle of attack of between 10° and 20°.

30. The fluid flow sensing device according to claim 1 wherein said airfoil member is dimensioned to have a low aspect ratio.

31. The fluid flow sensing device according to claim 1 further having an additional sensor associated therewith.

32. The fluid flow sensing device according to claim 31 wherein said additional sensor comprises a fluid flow sensor.

33. The fluid flow sensing device according to claim 32 wherein said fluid flow sensor is operatively associated with said airfoil member.

34. The fluid flow sensing device according to claim 32 wherein said fluid flow sensor is operatively associated with said frame.

35. The fluid flow sensing device according to claim 32 wherein said fluid flow sensor comprises a thermal fluid flow sensor.

36. The fluid flow sensing device according to claim 31 wherein said additional sensor comprises a pressure sensor.

37. The fluid flow sensing device according to claim 31 wherein said additional sensor comprises a temperature sensor.

38. The fluid flow sensing device according to claim 1 wherein said airfoil member includes a heater.

39. The fluid flow sensing device according to claim 1 wherein said airfoil member has a thickness normal to said plane wherein said at least one link has a thickness less than the thickness of said airfoil member.

40. The fluid flow sensing device according to claim 1 further defined as a device for sensing the velocity of a gas.

41. The fluid flow sensing device according to claim 40 further defined as a device for sensing the velocity of breathable gas from a respirator ventilating a patient.

42. The fluid flow sensing device according to claim 41 comprising a pair of fluid flow sensing devices, a first fluid flow sensing device measuring the gas flow velocity within an inspiratory branch of the respirator and a second fluid flow sensing device measuring the gas flow velocity within an expiratory branch of the respirator.

43. The fluid flow sensing device according to claim 40 further defined as a device for sensing the velocity of breathing gas of a patient.

44. A gas flow sensor for sensing the velocity of a gas along a flow direction, said sensor comprising:
a frame;
an airfoil member exposed to the gas flow, said airfoil member having a chord dimension extending generally along the gas flow direction, said airfoil member having end portions lying along the chord dimension, said airfoil member having a first airfoil element in one of said end portions and a second airfoil element in the other of said end portions, said first and second airfoil elements being formed as plates, said airfoil member having a center portion intermediate said first and second airfoil elements coupled to said frame, said airfoil member being oriented so that the chord dimension defines an angle of attack with respect to the gas flow direction so that the flow of gas past the airfoil member generates lift forces that vary in magnitude along the chord dimension of said airfoil member;
at least one link interposed between each of said airfoil elements and said center portion, said links being subjected to force as a result of the lift forces generated on said airfoil elements, said links undergoing strain, as a result of the forces to which they are subjected;
variable resistance detectors operatively associated with said links for detecting the response of said airfoil elements to the forces exerted on the airfoil elements; and
means for connecting said variable resistance detectors in a bridge configuration to provide a signal indication of gas flow velocity.

45. The gas flow sensor according to claim 44 further defined as a device for sensing the velocity of breathable gas from a respirator ventilating a patient.

46. The gas flow sensor according to claim 45 comprising a pair of gas flow sensors, a first gas flow sensor measuring the gas flow velocity within an inspiratory branch of the respirator and a second gas flow sensor measuring the gas flow velocity within an expiratory branch of the respirator.

47. The gas flow sensor according to claim 44 further defined as a device for sensing the velocity of breathing gas of a patient.

48. A method for sensing the velocity of a fluid flowing along a flow direction, said method comprising the steps of:
positioning an airfoil member formed as a plate member in the fluid so that a flat surface of the airfoil is subjected in its entirety to the fluid, the airfoil member having a shape and orientation with respect to the fluid flow direction to generate lift forces on the airfoil member perpendicular to the fluid flow direction, the magnitude of the forces being related to the velocity of the fluid flow;
applying the lift forces generated on the airfoil member to at least one link member coupling the airfoil member to a frame to cause the link member to undergo strain; and
ascertaining the response of said at least one link member to the lift forces exerted on the airfoil member to determine the velocity of the flowing fluid.

49. The method according to claim 48 wherein the airfoil member has an upstream portion and a downstream portion with respect to the fluid flow, each of which portions are coupled by at least one link member to the frame, wherein lift forces differing in magnitude are exerted on the upstream portion and on the downstream portion of the airfoil member, and wherein said ascertaining step is further defined as ascertaining the response of the link members to the differing forces exerted on the upstream portion and downstream portion to determine the velocity of the flowing fluid.

50. The method according to claim 49 wherein the lift forces generate bending in the link members and wherein said ascertaining step is further defined as ascertaining the response of the link members to the bending.

51. The method according to claim 49 further defined as using variable resistance elements to determine the response of the link members to the lift forces and wherein the ascertaining step further employs the relative change in resistance of variable resistance elements associated with the link members for the upstream and downstream portions of the airfoil member to determine the velocity of the flowing fluid.

52. The method according to claim 48 wherein the lift forces generate bending in the at least one link member and wherein said ascertaining step is further defined as ascertaining the response of the link member to the bending.

53. The method according to claim 48 further including a step of sensing the flow of fluid by a second sensing means.

54. The method according to claim 48 further including a step of measuring ambient other fluid phenomena in addition to fluid flow velocity.

* * * * *